United States Patent
Oberman et al.

(10) Patent No.: US 6,438,892 B1
(45) Date of Patent: Aug. 27, 2002

(54) BAITING SYSTEM FOR A FISHING HOOK

(76) Inventors: Kaeli Jean Oberman, 175 W. 62nd St., Excelsior, MN (US) 55331; Jeffrey P. Oberman, 175 W. 62nd St., Excelsior, MN (US) 55331

( * ) Notice: Subject to any disclaimer, the term of this patent is extended or adjusted under 35 U.S.C. 154(b) by 0 days.

(21) Appl. No.: 09/537,327

(22) Filed: Mar. 29, 2000

(51) Int. Cl.⁷ .............................................. A01K 97/04
(52) U.S. Cl. ................................................ 43/55; 43/4
(58) Field of Search ................................ 43/1, 4, 55

(56) References Cited

U.S. PATENT DOCUMENTS

| | | | | |
|---|---|---|---|---|
| 731,335 A | * | 6/1903 | Blachet | 43/55 |
| 2,502,816 A | | 4/1950 | Bennek | 43/4 |
| 2,531,551 A | | 11/1950 | Brecht et al. | 43/4 |
| 2,718,089 A | * | 9/1955 | Heaton | 43/55 |
| 2,786,297 A | * | 3/1957 | Simmons | 43/55 |
| 2,982,045 A | | 5/1961 | Highland | 43/4 |
| 3,059,369 A | | 10/1962 | Swanson | 43/4 |
| 3,308,570 A | | 3/1967 | Horton | 43/55 |
| 3,541,722 A | * | 11/1970 | Garrison | 43/4 |
| 3,975,853 A | | 8/1976 | Aaron | 43/4 |
| 4,047,320 A | * | 9/1977 | Lee | 43/55 |
| 4,118,807 A | | 10/1978 | McCauley | 43/4 |
| 4,815,230 A | | 3/1989 | Allen | 43/55 |
| 5,067,270 A | * | 11/1991 | Garrick | 43/55 |
| 5,103,585 A | * | 4/1992 | Pleasants | 43/55 |
| 5,377,445 A | * | 1/1995 | Brannon | 43/55 |
| 5,465,522 A | | 11/1995 | Varda | 43/4 |

* cited by examiner

*Primary Examiner*—Darren W. Ark
(74) *Attorney, Agent, or Firm*—Hugh D. Jaeger

(57) ABSTRACT

A baiting system for a fishing hook that controls, directs and holds live fishing bait, specifically leeches, in a confined space for proper threading on a fishing hook without requiring one's hands or fingers to touch the live bait. The system includes a funnel with a stem, a stopper to be inserted into the funnel at the stem, a soft plastic tubing engaged over the lower end of the stem, and at the lower end of the plastic tubing at least one hole followed by a slit, with optional opposing hole and slit, and a binder clip at the bottom to trap the bait. The bait, such as a leech, is dropped into the funnel and positioned by the stopper to slide tail first into the plastic tubing. The barb of the fish hook is inserted through the hole, into the tail of the bait, and then the binder clip is removed and the hooked bait is pulled down through the slit of the plastic tubing.

1 Claim, 2 Drawing Sheets

BAITING SYSTEM FOR A FISHING HOOK

CROSS REFERENCES TO CO-PENDING APPLICATIONS

None.

BACKGROUND OF THE INVENTION

1. Field of the Invention

The present invention is intended to be used as a baiting system for a fishing hook, and more particularly, is intended to be used as a hand-held fishing tool to facilitate the correct and proper threading of leeches, or other live bait, onto a fishing hook.

2. Description of the Prior Art

The traditional method of hooking a leech is to use bare hands and fingers to control the leech. It is difficult for most people to handle and control a slippery, squirming leech and hook it in the ideal location using this method. This method also incorporates the distasteful action of physically touching the leech. A secondary method has been to hook a leech while wearing gloves or using a cloth rag to handle and control the leech. One needs to firmly and accurately hold and control a live leech in order to hook it in the ideal location (just behind the sucker) and this is an almost impossible task to accomplish while wearing gloves or using a cloth rag. A third method has been to have another individual, preferably someone not afraid of touching leeches, hook the leech for you. The disadvantage of this method is that it requires the presence and assistance of a second individual and regularly requires the second individual to interrupt their own fishing activity in order to assist you.

SUMMARY OF THE INVENTION

The general purpose of the present invention is to provide a means for easily hooking live leeches on a fishing hook in the ideal location, just behind the sucker, without requiring the individual to touch the leech with one's hands or fingers, and at the same time eliminate the difficulty of handling and controlling the very slippery, squirmy leeches. Live leeches are an ideal fishing bait, but leeches are generally regarded as slithery, disgusting creatures that most people would prefer to never touch. In addition, live leeches are truly slippery, squirmy, and hard to control or handle, even with bare hands, making the process of threading them on fishing hooks quite difficult. The ideal location to hook a leech is on the tail end just behind the leech's sucker.

According to one embodiment of the present invention, there is provided a baiting system for a fishing hook, including a funnel with a stopper, a plastic tube over the stem of the funnel, a hole and a slit in the lower end of the plastic tube, and a binder clip.

One significant aspect and feature of the present invention is to provide a system to direct, control, steer and confine live slippery leeches for easy hooking without ever touching the leech with hands or fingers. At the same time, the system controls and confines a lively slippery leech, allowing one to easily hook the leech in the ideal location, just behind the sucker.

Having thus described embodiments and significant aspects and features of the present invention, it is the principal object of the present invention to provide a baiting system for a fishing hook for the baiting of a leech.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
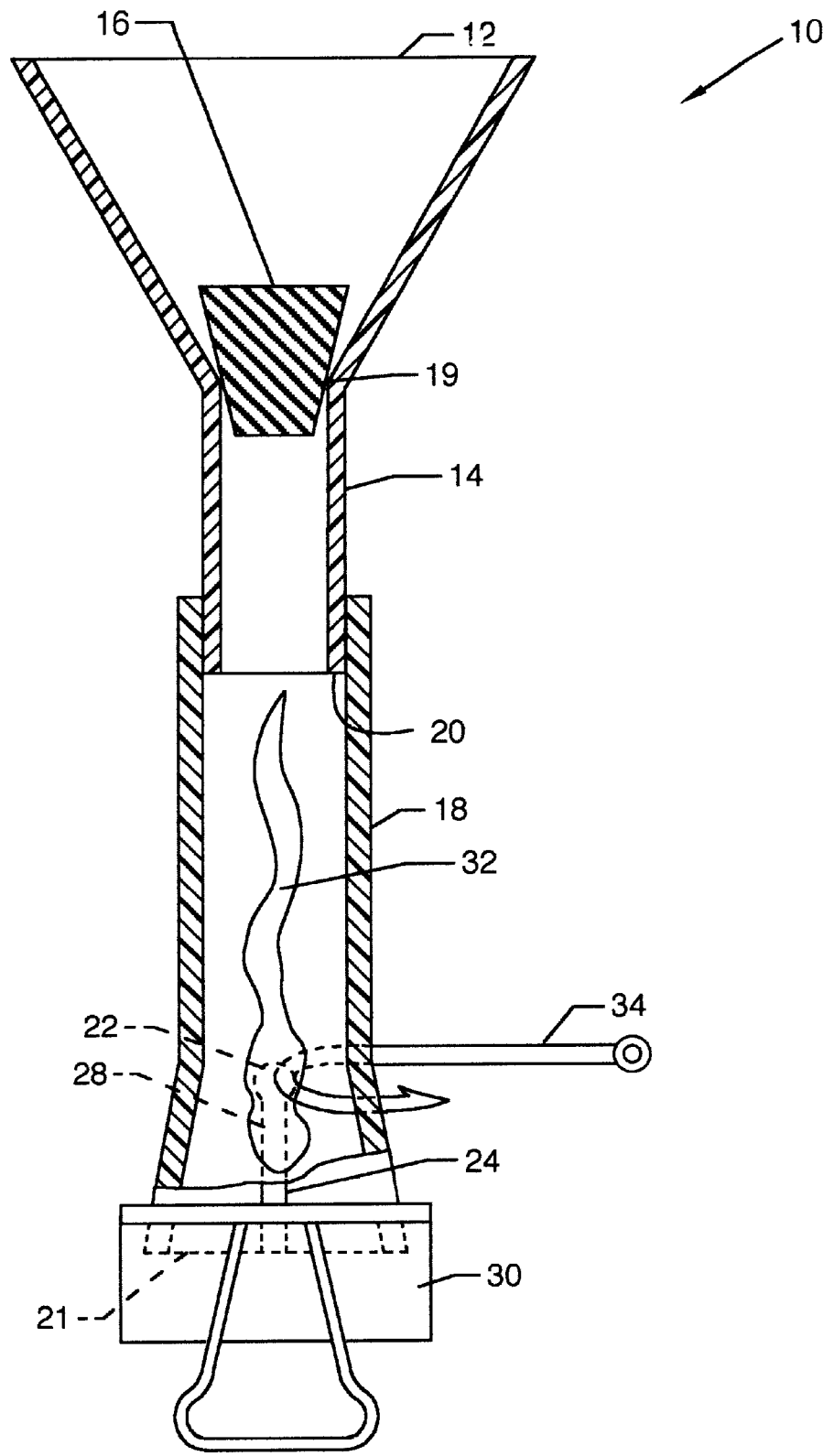
FIG. 1 illustrates an overall view, partly in cross section, of the baiting system for a fishing hook, the present invention; and, FIG. 2 illustrates a side view in partial cross section of the baiting system for a fishing hook.

FIG. 1 illustrates a front view, partly in cross section, the baiting system for a fishing hook 10, comprising in order a funnel 12 with a stem 14, a stopper 16 in the funnel 12 (and protruding into an upper hole 19) of the stem 14, soft plastic tubing 18 engaged over lower end 20 of the stem 14, the lower end 21 of the plastic tubing 18, a hole 22 followed by a slit 24 with optional hole 26 with opposing slit 28 are provided a binder clip 30 at the bottom traps a bait, such as a leech 32 where hook 34 is baited.

Figure 2:
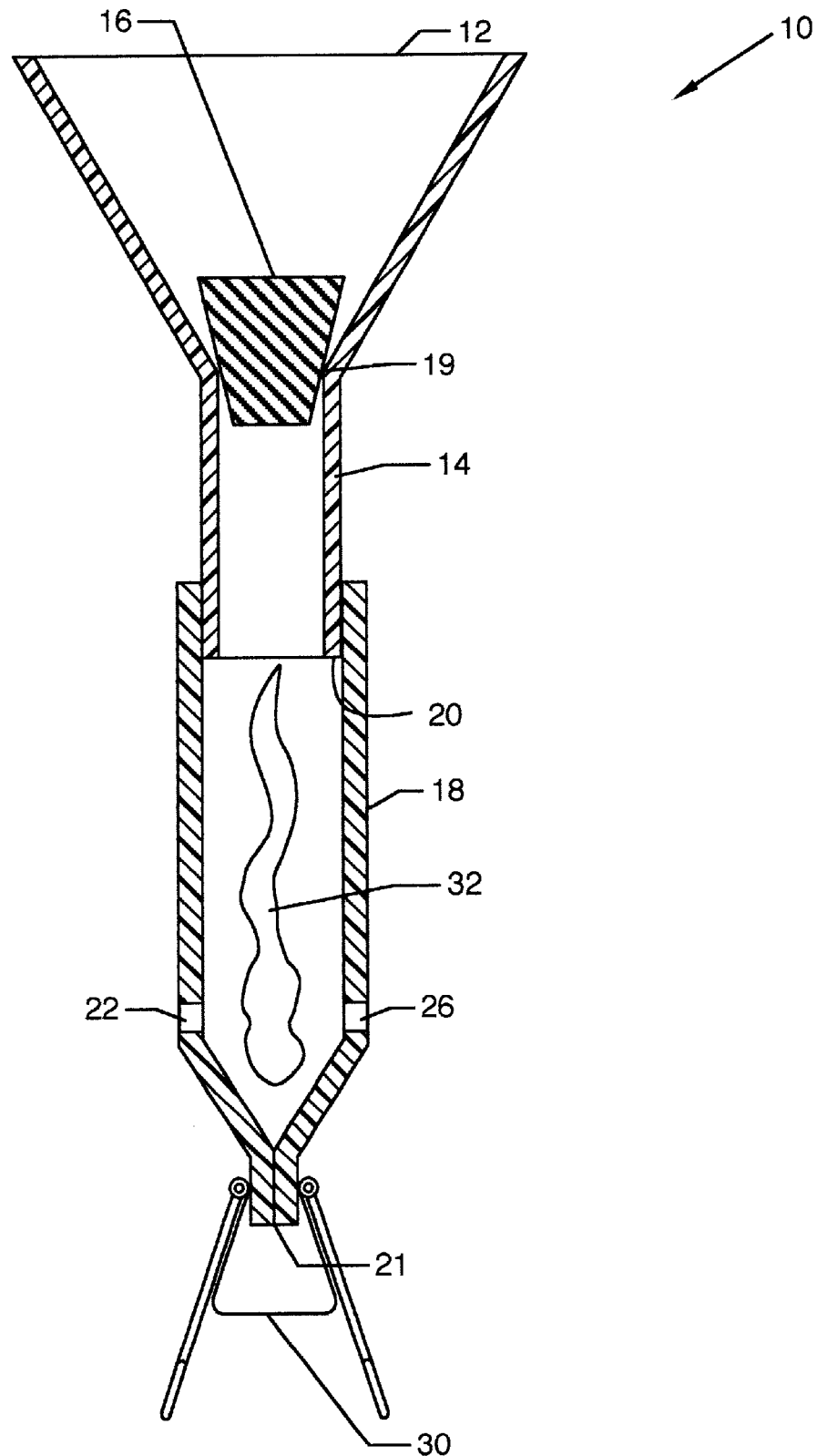

FIG. 2 illustrates a side view in partial cross section of the baiting system for a fishing hook, where all numerals correspond to those elements previously or otherwise described. Illustrated in particular are holes 22 and 26. It is understood that slits 24 and 28 extend downwardly from holes 22 and 26, respectively, to the lower end 21 of the plastic tubing 18.

MODE OF OPERATION

The leech 32 is dropped into the funnel 12, such as by a net, is moved to position the tail at the area of upper hole 19, the stopper 16 is removed and the leech 32 drops into the soft plastic tubing 18. The hook 34 is put through the hole 22, then through the tail of leech 32 just above the sucker, and then hole 26. The binder clip 30 is removed and the hook 34 with the leech 32 is pulled down through the holes 22 and 26, and down through the slits 24 and 28.

With reference to photograph 1, grip the baiting system for a fishing hook 10 by the funnel 12 and hold the funnel 12 straight up and down.

With reference to photograph 2, scoop up the leech 32 using a small net or strainer and pour the leech 32 into the top of the funnel 12.

With reference to photograph 3, tip the funnel 12 slightly and remove the stopper 16. Use the stopper 16 to guide and steer the tail of leech 32 down the stem 14 of the funnel 12.

With reference to photograph 4, tilt the funnel 12 upright and the slippery leech 32 will easily slide down into the lower end 21 of the clear plastic tubing 18.

With reference to photograph 5, grasp the baiting system for a fishing hook 10 by the top or preferably the stem of the funnel 12. When the tail of leech 32 completely covers the holes 22 and 26 in the lower end 21 of the clear plastic tubing 18, quickly thread the point of the fishing hook 34 through both holes 22 and 26, piercing the leech 32 just behind (above) the sucker.

With reference to photograph 6, tip the baiting system for a fishing hook 10 upside down so the binder clip 30 is at the top.

With reference to photograph 7, remove the binder clip 30 from the plastic tubing 18 and align the fishing hook 34 with the slits 24 and 28 in the plastic tubing 18.

With reference to photograph 8, gently pull on the fishing line tied to the hook 34 until the hooked leech 32 is completely out of the plastic tubing 18.

With reference to photograph 9, leech 32 is perfectly hooked on the fishing hook 34.

With reference to photograph 10, one is now ready to fish with a baited leech.

Various modifications can be made to the present invention without departing from the apparent scope hereof.

What is claimed is:

1. A baiting system for baiting a fishing hook with live bait, especially a live leech, comprising:

a. a stiff funnel having a conical portion and a cylindrical portion, the conical portion having a large diameter end and a small diameter end, and the cylindrical portion being joined to the conical portion at the small diameter end of the conical portion;

b. a stopper plug in the funnel at the location where the cylindrical portion joins the small diameter end of the conical portion;

c. a cylindrical pliable plastic tubing having first and second open ends, the cylindrical portion of the funnel extending into the cylindrical pliable plastic tubing at the first open end of the cylindrical pliable plastic tubing, the cylindrical pliable plastic tubing having a. hole through the wall thereof at a location spaced from the second open end, and a narrow slit through the wall of the cylindrical pliable plastic tubing leading from the hole to the extremity of the second open end; and, d. a clip for pinching together and closing the cylindrical pliable plastic tubing at the second open end to confine live bait within the cylindrical pliable plastic tubing when introduced into the cylindrical pliable plastic tubing from the funnel.

\* \* \* \* \*